No. 667,693. Patented Feb. 12, 1901.
G. G. FUCHS.
MATTRESS FILLING MACHINE.
(Application filed Aug. 6, 1900.)

(No Model.) 4 Sheets—Sheet 1.

Witnesses
Jas. T. McCathran
Louis G. Julihn

G. G. Fuchs, Inventor
by
C. G. Siggers
Attorney

No. 667,693. Patented Feb. 12, 1901.
G. G. FUCHS.
MATTRESS FILLING MACHINE.
(Application filed Aug. 6, 1900.)
(No Model.) 4 Sheets—Sheet 4.

G. G. Fuchs,
Inventor

UNITED STATES PATENT OFFICE.

GOTTFRIED G. FUCHS, OF EVANSVILLE, INDIANA.

MATTRESS-FILLING MACHINE.

SPECIFICATION forming part of Letters Patent No. 667,693, dated February 12, 1901.

Application filed August 6, 1900. Serial No. 26,049. (No model.)

*To all whom it may concern:*

Be it known that I, GOTTFRIED G. FUCHS, a citizen of the United States, residing at Evansville, in the county of Vanderburg and State of Indiana, have invented a new and useful Mattress-Filling Machine, of which the following is a specification.

This invention relates to a novel mattress stuffing or filling machine of that type distinguished by the aggroupment of a stuffing-box, a spout for the reception of the open end of the mattress-ticking, and a movable plunger within the stuffing-box and arranged to force the stuffing or filling material from the box into the ticking.

One object of the invention is to construct a machine of this character with spouts at opposite ends of the stuffing-box designed to be simultaneously filled or stuffed, the stuffing of each mattress or tick being effected by the alternate reciprocations in opposite directions of a reciprocating plunger mounted within the stuffing-box and operated by simple and efficient mechanism upon the exterior thereof.

A further object of the invention is to provide for the adjustment of the machine to facilitate the stuffing of mattresses of various sizes, this end being preferably attained by providing an adjustable longitudinal partition within the stuffing-box and connected with adjustable sections of the oppositely-disposed spouts, this partition defining an adjustable side wall of the effective plunger-chamber and determining by its adjustment the dimensions of the spout and of the chamber arranged for the reception of the stuffing or filling material.

Certain other objects of the invention subordinate to those enumerated will hereinafter appear as the necessity for their accomplishment is developed in the succeeding description when taken in connection with the accompanying drawings, in which I have illustrated the preferred embodiment of the invention.

Figure 1:
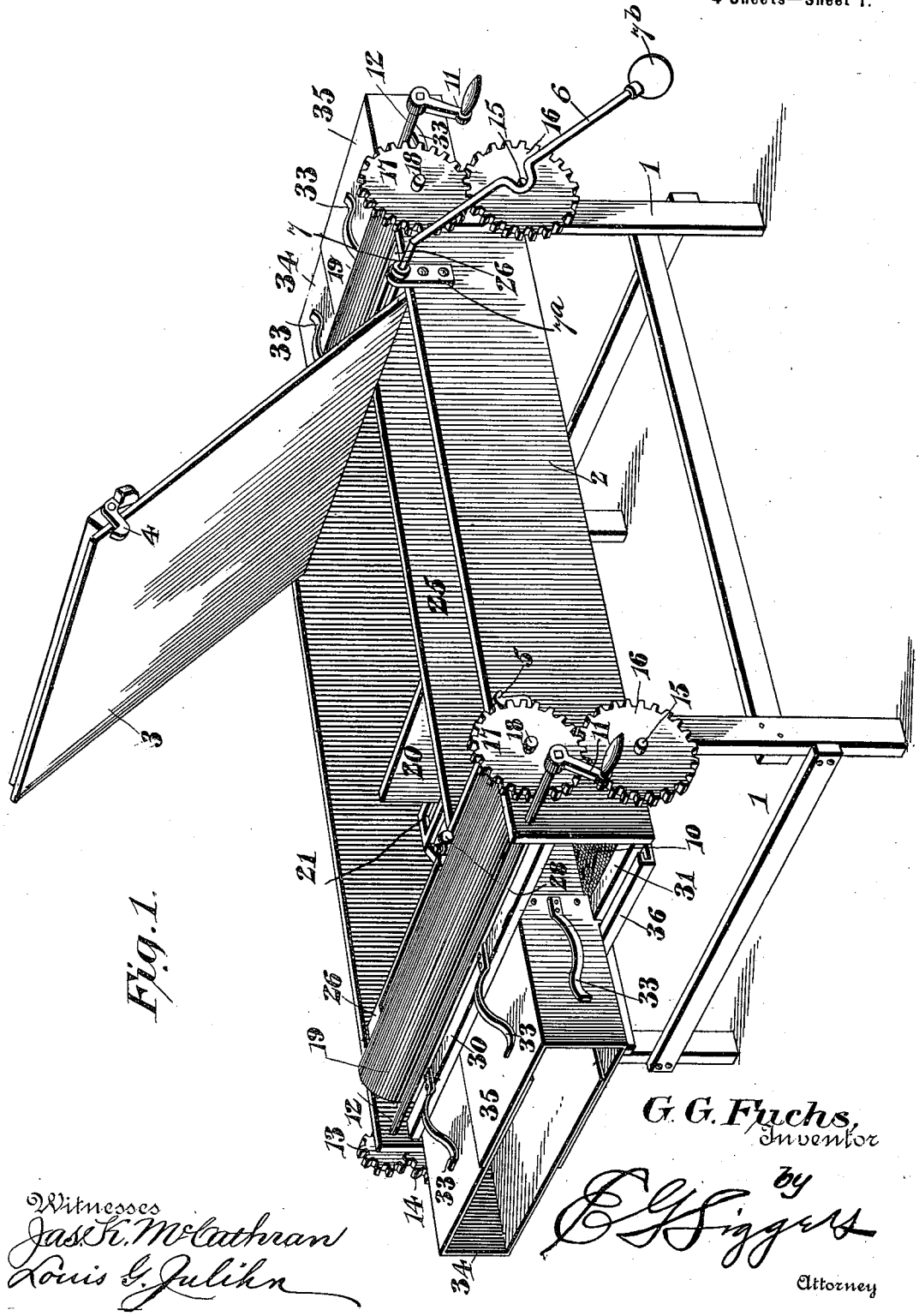
Figure 2:
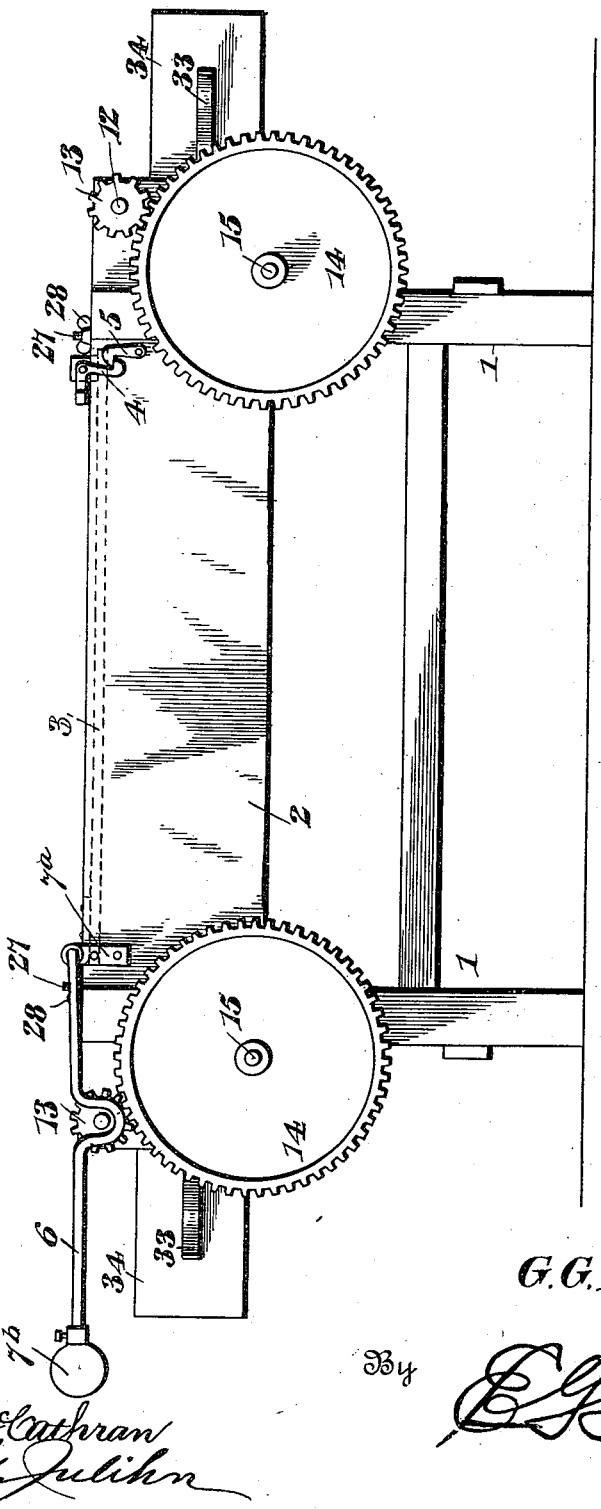
Figure 3:
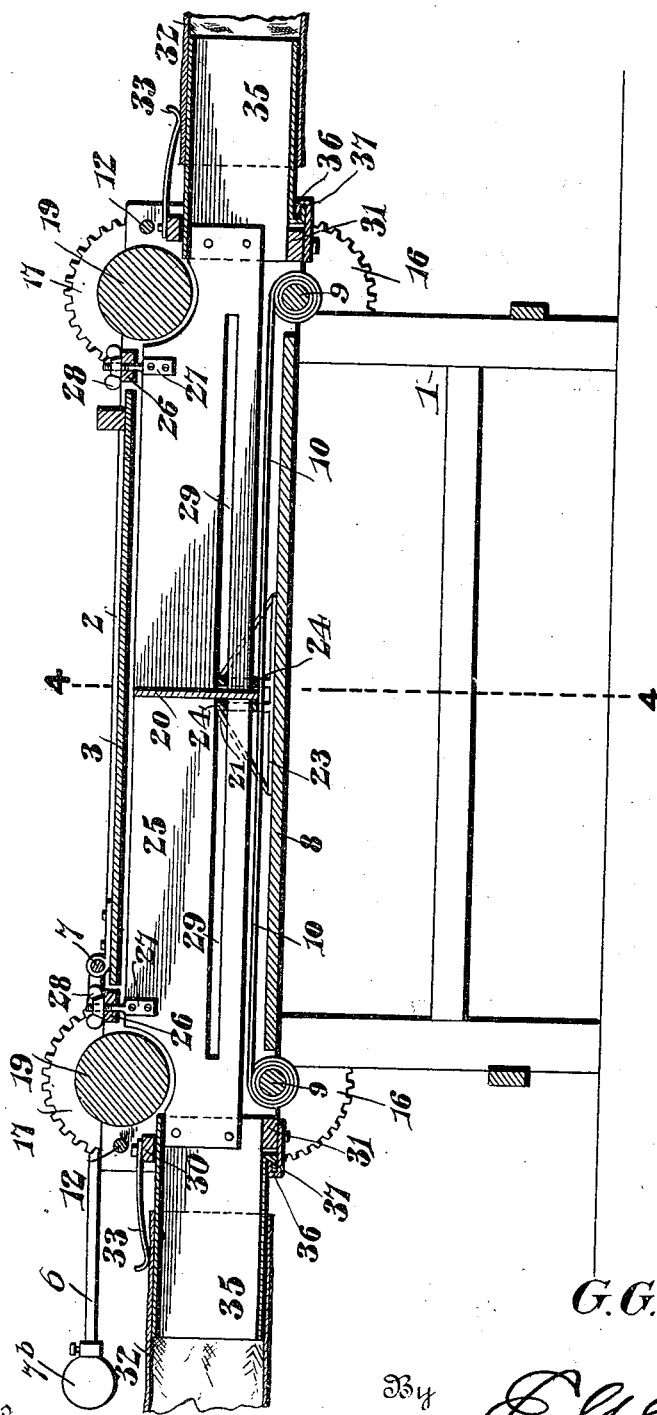
Figure 4:
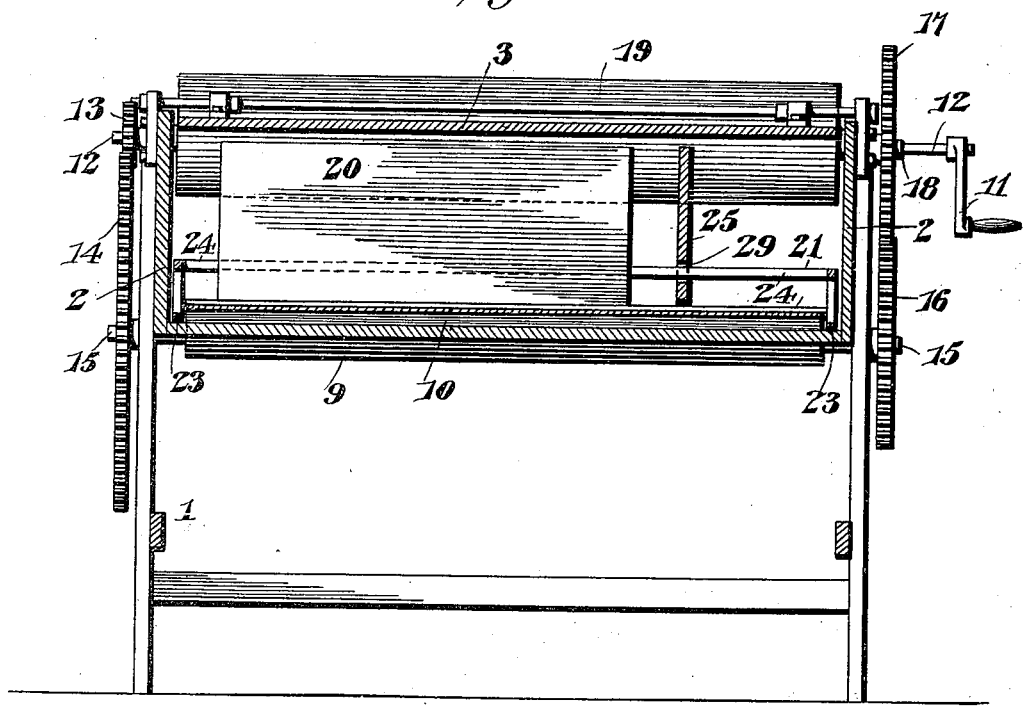
Figure 5:
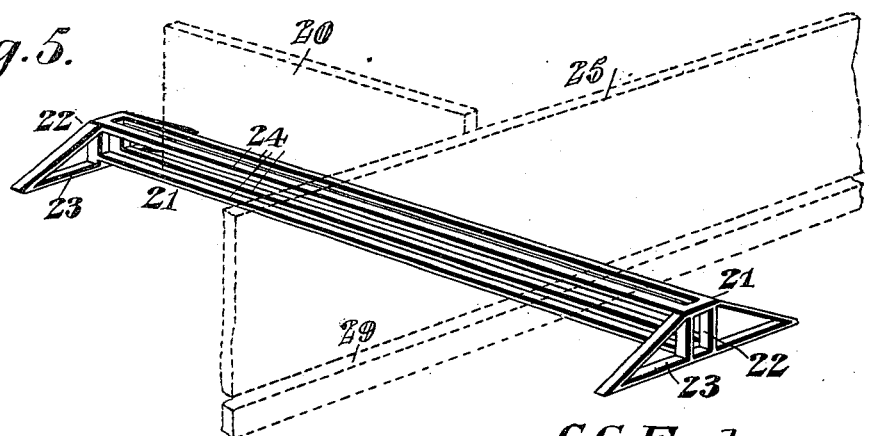

In said drawings, Figure 1 is a perspective view of my machine complete, showing the cover elevated to facilitate the filling of the plunger-chamber with the stuffing or filling material designed to be forced into the mattress covering or ticking through the movement of the plunger. Fig. 2 is a side elevation of the subject-matter of Fig. 1 looking from the opposite side. Fig. 3 is a central longitudinal section through the complete machine, showing the ends of two mattress-covers retained upon the spouts. Fig. 4 is a transverse vertical section on the line 4 4 of Fig. 3; and Fig 5 is a detail perspective view of the plunger-carrier, the plunger and the adjustable partition being illustrated in dotted lines.

Referring to the numerals of reference employed to designate corresponding parts throughout the several views, 1 indicates a suitable supporting-frame arranged for the support of an elongated stuffing-box 2, open at its opposite ends and closed by a hinged cover 3, having a pivoted catch 4, arranged for engagement with a coöperating keeper 5, carried by one of the side walls of the box. For the purpose of causing the cover to swing upwardly to permit access to the stuffing-box suitable counterweight mechanism is provided, one embodiment of which is illustrated in Fig. 3 and comprises two parallel arms 6, connected to the cover 3 adjacent to its opposite sides and offset to provide trunnions 7, constituting the hung mounting of the cover and journaled in suitable bearings $7^a$ upon the frame of the machine. Adjustably mounted on each arm 6 is an adjustable counterpoise $7^b$, constituting counterweights for the door.

Journaled between the side walls of the stuffing-box, immediately beyond the bottom 8 of the latter, are a pair of belt-rollers 9, to which are secured the opposite ends of a flexible belt 10, designed to be wound from one roller to the other by means of suitable operating mechanism—as, for instance, cranks 11, keyed upon the ends of crank-shafts 12, suitably journaled in the side walls of the stuffing-box 2 and provided with pinions 13, meshing with spur-gears 14, keyed or otherwise secured upon the ends of roller-shafts 15, which carry the belt-rollers 9. The pinions 13 and the gears 14 are preferably located beyond one side of the stuffing-box, and beyond the opposite side thereof the belt-shafts are provided with gear-wheels 16, meshing with similar gear-wheels 17, fixed upon the contiguous ends of a pair of shafts 18, upon which are mounted the transverse compression-rollers 19, extending transversely across the stuffing-box, at a suitable distance above the bottom thereof, and designed for the compression of the stuffing or filling material to cause the latter to be fed in the form of a bat to the mattress covers or ticks.

The stuffing or filling material is designed to be forced toward the ends of the stuffing-box by means of a plunger 20, movable with the belt 10. The plunger 20 obviously extends entirely across the stuffing-chamber, and as the width of this chamber is designed to be varied in a manner which will hereinafter appear provision must be made for employing plungers of different lengths. This end I attain by mounting what I shall term a "plunger-carrier" 21 upon the belt 10 at its center. This carrier is of peculiar form, being composed of rectangular end frames 22, carried by runners 23 and connected by four parallel bars 24, extending between corresponding corners of the end frames 2. The plunger-carrier thus constructed is preferably of a length corresponding to the width of the stuffing-box, and the runners 23 rest upon the bottom wall 8 of the box immediately beyond the side edges of the belt 10, to which belt the bottom bars of the carrier are secured to compel its movement in one direction or the other as the belt is wound upon one or the other of the belt-rollers 9. It will thus be seen that the plunger-carrier is of such skeleton form as to permit the lower edge of a flat board or plunger of any desired length to be set down into the carrier, between the bars thereof, for movement therewith. The regulation of the width of the plunger-chamber, which corresponds to the width of the mattress to be stuffed, is effected by the adjustment of a movable partition 25, located within the stuffing-box and extending nearly to the opposite ends thereof and from the belt 10 to the cover, in the depressed position of the latter. This partition 25 is cut away adjacent to its opposite ends for the accommodation of the compression-rollers 19 and is suspended from a pair of transverse longitudinally-slotted partition-supporting bars 26 by means of hangers 27, having their threaded shanks passed through the slots of the bars 26 and provided with wing-nuts 28, by means of which the hangers may be adjustably retained to effect the retention of the partition in any desired position.

It will be noted that the plunger-carrier and the adjustable partition are movable in different directions, and it is evident that the lower edge of the partition must be located close to the belt 10. It is necessary, therefore, to provide some form of interlocking engagement between the carrier or partition in order that both may be moved independently without interfering one with the other. I therefore provide an elongated slot 29 in the partition 25, through which extends the upper bars 24 of the plunger-carrier, the lower portion of the partition defined between the slot 29 and its lower edge being extended through the carrier, as indicated in Figs 3 and 5 of the drawings. This relation of the partition and carrier permits the position of the former to be adjusted as desired without interfering with the free movement of the latter, and obviously, therefore, the width of the plunger may be varied as desired and a plunger-board of the proper length may be set into the carrier to effect the stuffing of the tick.

At each end of the box are secured a pair of transverse spout-supporting bars 30 and 31, designed to sustain the inner ends of the spouts over which the ends of the mattress ticks or covers 32 are designed to be drawn and held by pivoted tick-retaining clamps 33, pivotally mounted upon the bars 30 and designed to be swung into their retaining positions to bear with more or less pressure upon the end of the tick drawn over the spout, as shown in Fig. 3 of the drawings. Each of these spouts is constructed of light sheet metal and comprises a pair of relatively adjustable sections 34 and 35, substantially U-shaped and interfitting, as shown in Fig. 1 of the drawings, to permit the width of the spouts to be regulated in accordance with the regulation of the width of the plunger-chamber. The spout-sections 34 are preferably rigidly retained against one side of the stuffing-box, and the sections 35 are secured to the opposite ends of the adjustable partition 25 for adjustment therewith. For the purpose of adjustably sustaining and guiding the movable spout-sections 35 the bars 31 are provided with guide-flanges 36, extending along their outer edges and designed to be engaged by flanges 37, located at the inner ends of the bottom walls of the movable spout-sections, as shown more clearly in Figs. 1 and 3 of the drawings.

The operation of my device is as follows: The width of the ticking to be stuffed having been ascertained, the nuts 28 are loosened and the partition 25 is moved to the desired position within the stuffing-box and is retained by tightening the nuts. The adjustment of the partition has of course effected a corresponding adjustment of the spouts and a plunger of proper length is inserted in the carrier. The ends of the ticks 32 are now drawn over the spouts and are retained by the clamps 30. The stuffing-chamber is then filled with the stuffing material, and the cover is closed and securely locked in place by means of the catch 4. The stuffing of the ticks is finally effected by the rotation of one or the other of the cranks 11, which, through the medium of the intermediate gearing, causes one of the belt-rollers to be rotated to wind the belt thereon and to draw the plunger 20 toward the end of the stuffing-box for the purpose of forcing the stuffing material through the spout and into the tick, said material being compressed as it passes under the compression-roller 19, located above the end of the belt. The cover of the box is now opened and the plunger-chamber at the opposite side of the plunger is filled with stuffing material, after which the other crank is rotated to effect the opposite movement of the plunger for the purpose of stuffing the tick at the opposite end of the machine.

From the foregoing it will be observed that I have produced a simple, durable, and efficient machine by means of which both the movements of a reciprocating plunger are utilized for the stuffing of mattresses retained upon spouts located at the opposite ends of the stuffing-box; but while the present embodiment of the invention appears at this time to be preferable I do not desire to limit myself to the structural details defined, as it is obvious that many variations and modifications thereof may be effected without departing from the spirit of the invention.

What I claim is—

1. In a mattress-stuffing machine, the combination with a stuffing-box having a spout at one end, of a transverse plunger-carrier and an adjustable longitudinal partition having interfitting engagement with the carrier to permit independent lateral movement of said members.

2. In a mattress-stuffing machine, the combination with a stuffing-box and spout, of a laterally-adjustable longitudinal partition within the stuffing-box, a plunger-carrier extending transversely across the plunger-box, and having a loose interfitting connection with the partition to permit independent movement of the partition and carrier in different directions, a plunger supported by the plunger-carrier, and means for operating the plunger.

3. In a mattress-stuffing machine, the combination with a stuffing-box and spout, of a plunger-belt extending over the bottom of the box, a plunger-carrier supported by the plunger-belt above the same and having runners located below the belt and slidable upon the bottom of the stuffing-box, a plunger supported by the plunger-carrier, and means for operating the plunger-belt.

4. In a mattress-stuffing machine, the combination with a stuffing-box and spout, of a plunger-belt extending over the bottom of the box, a plunger-carrier of skeleton form carried by the belt and having runners located beyond the opposite edges thereof, an adjustable horizontal partition provided with a slot for the reception of a portion of the plunger-carrier and having its lower portion extended through said carrier, a plunger reciprocably mounted in the plunger-carrier, and means for operating the belt.

5. In a mattress-stuffing machine, the combination with a stuffing-box and spout, of slotted partition-supporting bars disposed transversely across the box adjacent to the opposite ends thereof, a longitudinal partition within the box, hangers supporting the partition and adjustably retained within the slots of the bars, adjustable devices carried by the hangers for securing them in their adjusted positions and for slightly raising or lowering the partition, a movable plunger within the stuffing-box, and means for actuating the plunger.

6. In a mattress-stuffing machine, the combination with a stuffing-box having spout-sections permanently connected to the opposite ends of one side wall, a laterally-adjustable longitudinal partition within the box having adjustable spout-sections carried at its opposite ends and interfitting with the permanent spout-sections, belt-rollers located at the opposite ends of the box, a plunger-belt connected at its opposite ends to said rollers, a plunger-carrier carried by the belt for movement therewith, a plunger supported by the plunger-carrier, a compression-roll extending across the box at each end thereof, independent operating mechanism for each belt-roller and its adjacent compression-roll, and means for retaining the ticks upon the spouts.

7. In a mattress-making machine, the combination with a stuffing-box having spout-sections permanently connected to the opposite ends of one side wall, of a laterally-adjustable longitudinal partition within the box, adjustable spout-sections operatively connected with the opposite ends of the partition for adjustment therewith and interfitting with the permanent spout-sections, belt-rollers located at the opposite ends of the box, a plunger-belt connected at its opposite ends to said rollers, a plunger-carrier carried by the belt for movement therewith, a plunger supported by the plunger-carrier, a compression-roll extending across the box at each end thereof, and independent operating mechanism for each belt-roller and its adjacent compression-roll.

8. In a mattress-stuffing machine, the combination with a stuffing-box having an adjustable longitudinal partition and provided with a spout at each end, each of said spouts being composed of relatively adjustable sections one of which is carried by the partition and adjustable therewith, a roller carried at each end of the stuffing-box, a plunger-belt connected at its opposite ends to said rollers, a plunger-carrier mounted upon the plunger-belt and having interfitting engagement with the partition to permit independent lateral movement of the partition and carrier, respectively, a plunger carried by the plunger-carrier, and means for operating the plunger-belt.

9. In a mattress-stuffing machine, the combination with a stuffing-box having an adjustable longitudinal partition and provided with a spout at each end, each of said spouts being composed of relatively adjustable sections one of which is carried by the partition and adjustable therewith, a roller carried at each end of the stuffing-box, a plunger-belt connected at its opposite ends to said rollers, a plunger-carrier mounted upon the plunger-belt and having interfitting engagement with the partition to permit independent lateral movement of the partition and carrier, respectively, a plunger carried by the plunger-carrier, a compression-roll disposed above each of the belt-rollers, and independent operating devices for each belt-roller, each of said devices being arranged to operate the adjacent compression-roll.

In testimony that I claim the foregoing as my own I have hereto affixed my signature in the presence of two witnesses.

GOTTFRIED G. FUCHS.

Witnesses:
LANE B. OSBORN,
LOUIS MITISKA.